(12) United States Patent
Pabst

(10) Patent No.: US 7,614,485 B2
(45) Date of Patent: Nov. 10, 2009

(54) DISK BRAKE COMPRISING A COOLING MEMBER

(75) Inventor: Hans-Georg Pabst, Gaimersheim (DE)

(73) Assignee: Audi AG, Ingolstadt (DE)

( * ) Notice: Subject to any disclaimer, the term of this patent is extended or adjusted under 35 U.S.C. 154(b) by 315 days.

(21) Appl. No.: 10/544,852

(22) PCT Filed: Nov. 28, 2003

(86) PCT No.: PCT/EP03/13448

§ 371 (c)(1),
(2), (4) Date: Aug. 8, 2005

(87) PCT Pub. No.: WO2004/070305

PCT Pub. Date: Aug. 19, 2004

(65) Prior Publication Data

US 2006/0131117 A1    Jun. 22, 2006

(30) Foreign Application Priority Data

Feb. 8, 2003    (DE) .................. 103 05 249

(51) Int. Cl.
*F16D 65/853* (2006.01)
*F16D 8/32* (2006.01)
*F16D 65/78* (2006.01)
*F16D 65/84* (2006.01)

(52) U.S. Cl. .................. 188/264 CC; 188/264 R; 188/264 D; 188/264 P

(58) Field of Classification Search ............. 188/264 R, 188/264 D, 264 F, 264 CC, 264 P; 165/185
See application file for complete search history.

(56) References Cited

U.S. PATENT DOCUMENTS

| 2,764,265 | A |   | 9/1956  | Runner |
|-----------|---|---|---------|--------|
| 2,788,870 | A | * | 4/1957  | Heck .................. 188/264 E |
| 2,986,238 | A | * | 5/1961  | Eaton ................. 188/251 M |
| 3,473,631 | A | * | 10/1969 | Schmid ................ 188/71.1 |
| 3,767,015 | A |   | 10/1973 | Odier |
| 3,850,267 | A |   | 11/1974 | Odier |
| 5,077,103 | A |   | 12/1991 | Wagner et al. |
| 5,314,570 | A | * | 5/1994  | Ikegaya et al. ............ 117/103 |
| 5,542,471 | A |   | 8/1996  | Dickinson |
| 5,566,752 | A | * | 10/1996 | Arnold et al. ............ 165/185 |
| 7,144,624 | B2| * | 12/2006 | Knowles et al. ........... 428/364 |
| 2002/0100581 | A1 | * | 8/2002 | Knowles et al. ........... 165/185 |

FOREIGN PATENT DOCUMENTS

| FR | 701725 | 12/1953 |
| WO | WO 01/67019 | 9/2001 |

* cited by examiner

*Primary Examiner*—Robert A Siconolfi
*Assistant Examiner*—Thomas W Irvin
(74) *Attorney, Agent, or Firm*—Novak, Druce & Quigg LLP

(57) ABSTRACT

The invention relates to a disk brake, especially for a motor vehicle, comprising a rotatably mounted brake disk and at least one brake lining that is disposed in a caliper and is mounted so as to be laterally movable towards the brake disk. In order to reduce heating of the brake disk during braking, a cooling member is provided which is made of a heat-conducting material and encompasses at least one fastening element. The fastening element allows the cooling member to be arranged in a position in which the heat-receiving face thereof is located on one side of the brake disk while the area of the cooling member, which is located away from the heat-receiving face, is connected to a cooler.

6 Claims, 2 Drawing Sheets

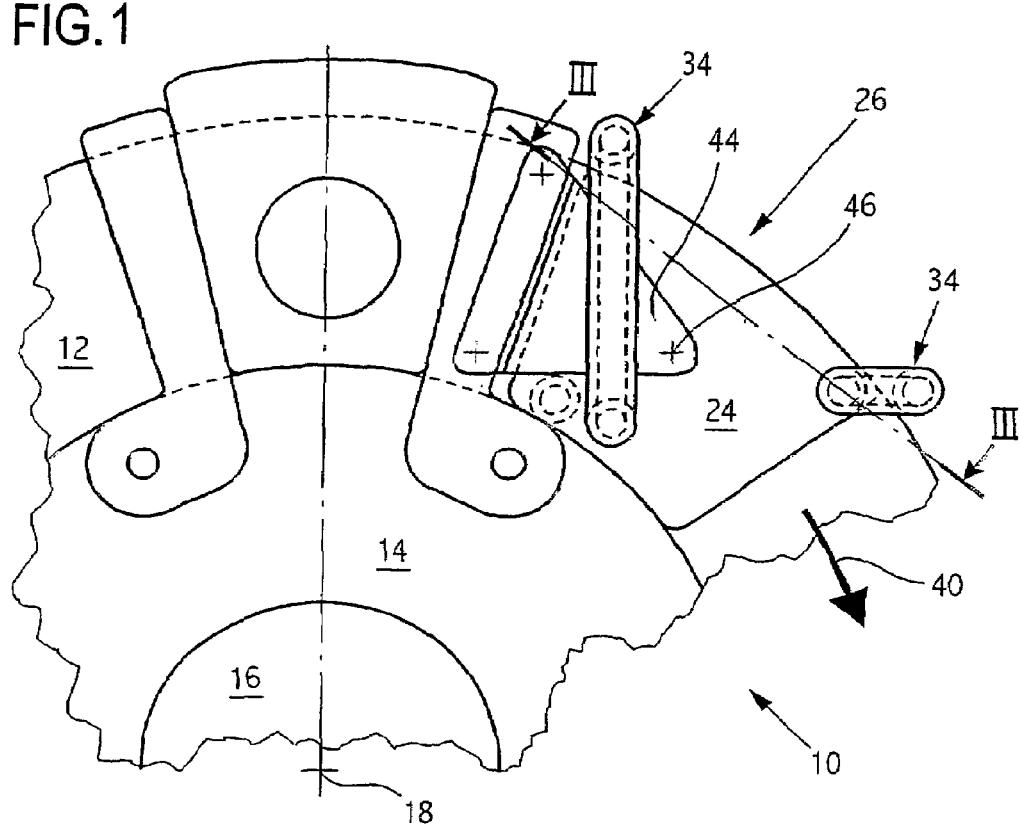
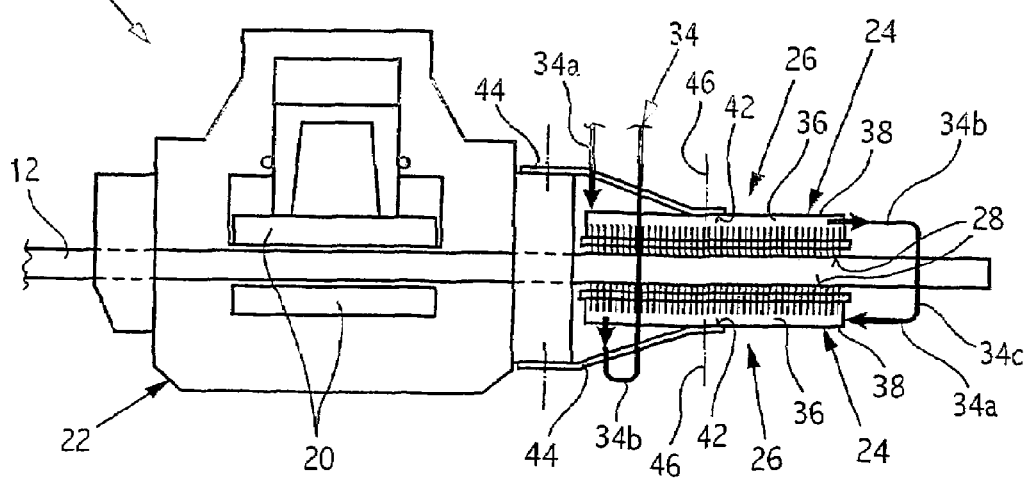

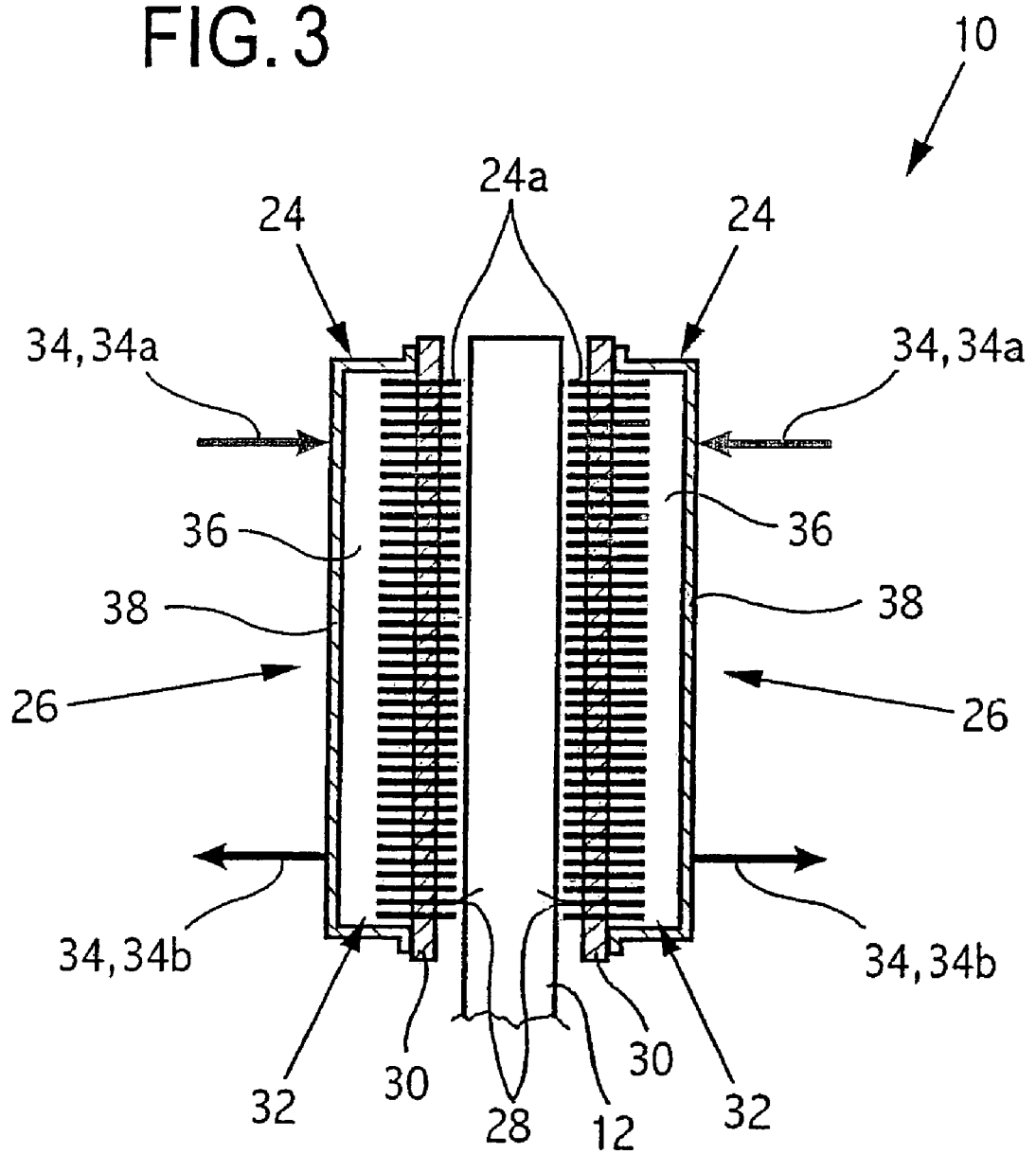

DISK BRAKE COMPRISING A COOLING MEMBER

This application is a § 371 application of PCT/EP2003/013448, which claims priority from DE 10305249.6, filed Feb. 8, 2003.

BACKGROUND

This invention relates to a disk break.

SUMMARY OF THE INVENTION

In a braking process the friction which occurs between the brake disk and the brake linings produces heat which is transferred to the components involved and especially to the brake disk. To protect the materials and components involved, there is a requirement for a temperature as low as possible in the area of the components involved. For strong and longer braking the temperature can however reach a level which is damaging to the affected components.

This object is achieved by the characterizing features specified in claim 1 in conjunction with the features of its preamble.

The invention is based on the finding that heating can be reduced by concerted dissipation of heat from the brake disk.

As claimed in the invention, the disk brake has a cooling member of heat conductive material which is provided at least with one fastening component with which it can be configured in the position in which its heat absorption side is located on one side of the brake disk, and with its area located away from the heat absorption side is connected to a cooler. The cooling member removes heat in a concerted manner from the brake disk, transfers it to the cooling member and the heat is dissipated by the cooler. As a result, potential heating of the brake disk, which might otherwise occur, is greatly reduced. Moreover, the heating of the brake linings and their adjacent components is reduced since the brake disk absorbs heat from these components as a result of its reduced possible heating.

Preferably the heat-conducting material of the cooling member consists of copper of highly heat-conducting plastic, the copper or the heat-conducting plastic having preferably embedded highly heat-conducting carbon fibers. In particular the carbon fibers run transversely to the heat absorption side. In this way, on the one hand high heat conduction in the cooling member and thus also efficient transport of the heat to the cooler are guaranteed. Highly heat-conductive carbon fibers which are commercially available with a specific thermal conductivity of up to 1000 W/(mK) facilitate this high heat conduction. Even where these carbon fibers are processed by embedding into available components which are known on the specialty market under the description "CPK components" thermal conductivity up to 600 W/(mK) can be achieved. These materials are lighter than aluminum. The cooling member for disk brakes leads to weight reduction since the double-walled vented brake disk is replaced by a light disk ring without cooling air guides.

Heat absorption can be improved primarily when the carbon fibers are jacketed, especially sprayed, with a metal, especially copper; this contributes to efficient heat conduction in the cooling member.

According to one embodiment of the invention, the carbon fibers stand up on the heat absorption side and/or on the rear side which is located away from the heat absorption side like fur hairs. This improves heat transfer to the carbon fibers and from the latter to the cooling medium.

Moreover, the stability of the cooling member can be increased and the possibilities of its attachment in the area of the disk brake can be improved if the material of the cooling member is enclosed by a frame.

Preferably on the rear side of the cooling member located away from the heat absorbing side there is a cavity which is enclosed by a housing and which is connected to the cooling circuit. This facilitates efficient dissipation of heat from the rear side of the cooling member.

According to one embodiment of the invention, the fastening element is configured more or less in the middle in the rear side which is located away from the heat absorption side. In this way simple support for the cooling member is made possible, for support on only one support point an optimum position of the heat absorption side relative to the brake disk being ensured.

Preferably the fastening element is connected to a spring, especially a leaf spring, with a spring path which is aligned transversely to the heat absorption side and holds the cooling member on the side of the brake disk. The contact of the heat absorption side with the brake disk for an air gap equal to zero is ensured in this way and therefore also optimum heat transmission. Moreover automatic tracking of the cooling member as the brake disk wears is ensured so that the air gap always remains equal to zero.

BRIEF DESCRIPTION OF THE DRAWINGS

The invention is detailed below using the embodiment shown in the drawings. In the specification, in the claims, in the abstract, and in the drawings the terms and assigned reference numbers used in the list of reference numbers given in the back are used.

FIG. 1 shows a simplified side view of the upper half of a disk brake of a motor vehicle, especially a passenger car, with a cooling member as claimed in the invention;

FIG. 2 shows an overhead view of the disk brake; and

FIG. 3 shows a simplified partial section along line III-III in FIG. 1.

DETAILED DESCRIPTION OF THE INVENTION

The disk brake designated as 10 in its entirety has a brake disk 12 in the form of a flat disk ring which is attached to an annular brake disk carrier 14 which is attached to a body of revolution 16 in a manner which is not shown, for example a rotatably mounted and optionally driven and optionally steerable wheel shaft or wheel axle. Of the body of revolution 16 or the wheel shaft or wheel axle, only the axis of rotation 18 is shown in FIG. 3.

On both sides of the brake disk 12 there is one, for example, disk-shaped, brake lining 20 each in one caliper 22. By actuating the brake pedal (not shown) in the conventional manner the brake disk 12 can be squeezed between the brake linings 20, by which the braking process is initiated. The caliper 22 which encloses the brake disk 12 for example in a U-shape is fixed relative to the axis of rotation 18 in a manner which is not shown. It can be attached to a wheel bearing carrier which is not shown.

The brake disk 12 can be configured differently and can consist for example of metal, especially gray cast iron or preferably alloyed steel. But it can also consist of ceramic or can be coated with ceramic in the area of its friction surfaces. Sintered aluminum ceramic fibers and carbon fibers (silicon carbide) are suitable as ceramic material. The ceramic coating can be arranged in the form of a ring, or segmented, for example in the form of segments which are fixed on a carrier ring. The brake disk 12 is preferably designed single-walled, by which a small construction mode is achieved and material and weight are saved.

In braking operation, due to friction, heat which the brake disk 12 absorbs as solid-borne heat is generated and it can be of such a high temperature that the brake disk 12 itself or even adjacent parts of the disk brakes 10 or the body of the vehicle can suffer damage.

Offset in the peripheral direction to the brake lining 20 which is configured on one side or both sides, on one side or one both sides of the brake disk 12 there is one cooling member 24 each which absorbs part of this heat and dissipates it and in this way reduces the temperature transferred to the brake disk 12 in the braking process or does not allow it to rise so greatly.

The cooling member 24 is part of a cooling means 26 and has a plate shape with a flat heat absorption surface 28 on its side facing the brake disk 12. The cooling member 24 consists of a material of high thermal conductivity, especially of embedded carbon fibers 24a, preferably highly heat conductive carbon fibers 24a which are known in a form processed into components as CFK components. The carbon fibers 24a are joined with a matrix into a solid material.

In one preferred configuration the carbon fibers 24a are configured in an alignment transverse to the heat absorption side 28 and are connected to one another on their jacket surfaces. In the process the carbon fibers 24a can be jacketed, preferably extrusion-coated, with metal, especially metal of high thermal conductivity, such as copper, for example. On the one hand, in this way thermal conductivity and on the other hand mechanical coherence are improved. The fiber material and the fibers can be enclosed by a frame 30, by which the strength and stability of the cooling member 24 are further increased.

The cooling member 24 interacts on its rear side facing away from the heat absorbing side 28 with a cooler 32 and is connected to it. In this way the heat routed to the rear side in the cooling member 24 is dissipated. The cooler 32 can function with a vaporizing medium for the purpose of a so-called heat pipe.

In the embodiment there is a cooling circuit 34 with a preferably liquid cooling medium, for example water. The cooling circuit 34 flows through a sealed cavity 36 which is configured on the rear side and which is bordered on the rear side and on its periphery by a housing 38. The housing can be a one-piece section or a rear-side add-on piece of the frame 30. A supply line and discharge line which pass through the housing 38 are designated as 34a and 34b.

It is preferable if the carbon fibers 24a on the heat absorption side 28 and/or the rear side rise above the embedding in the cooling member 24 and stick out like short fur hairs, and thus project into the cooling medium on the rear side. The metal enclosing the carbon fibers 24a improves the heat conduction. Carbon fibers in addition to their high thermal conductivity also have the advantage of being able to capture and relay radiant heat with high efficiency due to their black color.

The cooling member 24 can be attached directly or by its frame 30 or the housing 38 relative to the axis of rotation 18, for example to the caliper 22. One especially advantageous position for the cooling member 24 is in the direction of rotation 40 of the brake disk 12 directly behind the brake linings 20 or the caliper 22 where the temperature is the highest.

The air gap between the heat absorbing side 28 and the brake disk 12 should be as small as possible for purposes of good heat transmission. The cooling member 24 can also lightly adjoin the brake disk 12. As FIG. 2 shows, the carbon fibers 24a sticking out on the heat absorption side 28 can be elastically flexible and adjoin the brake disk 12 somewhat bent. In this way an air gap which is formed by wear on the brake disk 12 can be automatically bridged by relief motion of the carbon fibers 24a so that an air gap is avoided.

An air gap can also be avoided when the cooling member 24 is movably guided in a guide 42 which is directed transversely to the heat absorption side 28 and is lightly pretensioned by the force of a spring 42 against the brake disk 12. In the embodiment the cooling member 24 is held, guided, and pretensioned lightly against the brake disk 12 by the spring 44. The spring 44 is preferably a leaf spring which is attached preferably in the middle area of the rear wall of the housing 38 on a fastening element 46 which is configured on the rear wall. In its other end area the spring 44 is attached for example to the caliper 22 or to an add-on piece of the latter. The fastening elements can be for example holes for screws or rivets which are suggested by the center lines.

The cooling bodies 24 or cooling means 26 which are configured on both sides of the brake disk 12 are arranged mirror-symmetrically relative to the brake disk 12. The discharge line 34b of one cooling member 24 and the supply line 34a of the other cooling member 24 can be formed by a common connecting line 34c which bypasses the brake disk 12.

When the cooling bodies 24 are configured to be movable against the brake disk 12, the supply lines and discharge lines 34a, 34b, 34c are flexible lines.

REFERENCE NUMBER LIST 10 disk brake
12 brake disk
14 brake disk carrier
16 body of revolution
18 axis of rotation
20 brake lining
22 caliper
24 cooling member
24a carbon fibers
26 cooling means
28 heat absorbing side
30 frame
32 cooler
34 cooling circuit
34a supply line
34b discharge line
34c connecting line
36 cavity
38 housing
40 direction of rotation
44 spring
46 fastener

The invention claimed is:

1. A device supportable on a vehicle and cooperable with a disk of a brake assembly thereof for cooling said disk, comprising:

a housing provided with a wall section having an exterior planar surface disposable into engagement with a surface of said disk, and a chamber including an inlet and an outlet for circulating a coolant therethrough; and a plurality of transversely disposed, thermally conductive fibers embedded in said wall section, providing a first set of protruding exterior ends having lengths greater than the spacing between said planar surface and said disk when mounted, allowing such protruding, exterior ends to flex and thus continuously engage said disk as said disk wears and said spacing between said planar surface and said disk increases, and a second set of protruding, interior ends disposed within said chamber communicable with coolant disposed therein.

2. A device according to claim 1 wherein said fibers are formed of carbon.

3. A device according to claim 1 wherein said fibers are embedded in copper.

4. A device according to claim 1 wherein said protruding, exterior ends of said fibers are coated with an artificial diamond material.

5. A device according to claim 1 wherein said device is mountable on the caliper housing of such brake assembly.

6. A device according to claim 4 including means operatively interconnectable between said caliper housing and said first-named housing for biasing said first-named housing toward said disk when said device is mounted on said caliper housing.

\* \* \* \* \*